United States Patent
Kimura et al.

(10) Patent No.: US 9,280,030 B2
(45) Date of Patent: Mar. 8, 2016

(54) METHOD FOR PRODUCING SEMICONDUCTOR OPTICAL DEVICE AND SEMICONDUCTOR OPTICAL DEVICE

(71) Applicant: SUMITOMO ELECTRIC INDUSTRIES, LTD., Osaka-shi, Osaka (JP)

(72) Inventors: Daisuke Kimura, Yokohama (JP); Hideki Yagi, Machida (JP); Takamitsu Kitamura, Fujisawa (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/329,095

(22) Filed: Jul. 11, 2014

(65) Prior Publication Data

US 2015/0023627 A1 Jan. 22, 2015

(30) Foreign Application Priority Data

Jul. 16, 2013 (JP) .................................. 2013-147260

(51) Int. Cl.
*G02F 1/225* (2006.01)
*G02F 1/21* (2006.01)

(52) U.S. Cl.
CPC ........ *G02F 1/2257* (2013.01); *G02F 2001/212* (2013.01)

(58) Field of Classification Search
CPC .................................................. G02F 1/2257
See application file for complete search history.

(56) References Cited

U.S. PATENT DOCUMENTS

| | | | | |
|---|---|---|---|---|
| 4,361,887 A * | 11/1982 | Nakamura et al. | ........... | 372/50.1 |
| 4,693,543 A * | 9/1987 | Matsumura et al. | ............ | 385/14 |
| 5,042,045 A * | 8/1991 | Sato | ........................... | 372/46.01 |
| 5,084,893 A * | 1/1992 | Sekii et al. | ................. | 372/46.01 |
| 5,135,606 A * | 8/1992 | Kato et al. | ....................... | 216/20 |
| 5,473,120 A * | 12/1995 | Ito et al. | ........................ | 174/264 |
| 5,499,259 A * | 3/1996 | Makita | ..................... | 372/45.012 |
| 5,658,824 A * | 8/1997 | Itoh et al. | ........................ | 438/38 |
| 6,687,039 B2 * | 2/2004 | Shirai | ........................... | 359/254 |
| 7,024,057 B2 * | 4/2006 | Li et al. | ............................. | 385/3 |
| 7,174,059 B2 * | 2/2007 | Oikawa et al. | ..................... | 385/3 |
| 7,260,280 B2 * | 8/2007 | Ichioka et al. | ..................... | 385/8 |
| 7,482,617 B2 * | 1/2009 | Yamamoto et al. | ............ | 257/12 |

(Continued)

FOREIGN PATENT DOCUMENTS

| | | | | |
|---|---|---|---|---|
| JP | 2005332928 A | * 12/2005 | .............. | H05K 3/46 |
| JP | 2010278154 A | * 12/2010 | | |

(Continued)

*Primary Examiner* — Peter Radkowski
(74) *Attorney, Agent, or Firm* — Smith, Gambrell & Russell LLP.

(57) ABSTRACT

A method for producing a semiconductor optical device includes the steps of forming first and second optical waveguides; forming a first resin layer on the first and the second optical waveguides; forming an opening in the first resin layer; forming a first electrode in the opening; forming a second resin layer on the first electrode and the first resin layer; forming a groove in the second resin layer on the first electrode; forming a second electrode on the second resin layer, a side surface of the groove, and the top surface of the first electrode; and forming a third electrode on the second electrode. The second and third electrodes have a region in which the second and third electrodes pass over the second optical waveguide, and, in the region, the first and second resin layers are disposed between the second electrode and the second optical waveguide.

8 Claims, 9 Drawing Sheets

(56) References Cited

U.S. PATENT DOCUMENTS

| | | | |
|---|---|---|---|
| 7,657,146 B2* | 2/2010 | Laval et al. | 385/131 |
| 7,751,456 B2* | 7/2010 | Kawasaki et al. | 372/46.01 |
| 7,804,870 B2* | 9/2010 | Takada et al. | 372/46.01 |
| 8,124,543 B2* | 2/2012 | Yagi et al. | 438/737 |
| 8,358,891 B2* | 1/2013 | Shimizu et al. | 385/40 |
| 8,483,524 B2* | 7/2013 | Li et al. | 385/14 |
| 8,618,638 B2* | 12/2013 | Yoneda et al. | 257/623 |
| 8,643,929 B2* | 2/2014 | Gill et al. | 359/259 |
| 8,648,435 B2* | 2/2014 | Konno | 257/432 |
| 8,693,811 B2* | 4/2014 | Morini et al. | 385/3 |
| 8,724,933 B2* | 5/2014 | Takagi | 385/3 |
| 8,948,606 B2* | 2/2015 | Tanaka et al. | 398/180 |
| 2004/0052442 A1* | 3/2004 | Li et al. | 385/3 |
| 2005/0271313 A1* | 12/2005 | Oikawa et al. | 385/3 |
| 2006/0209914 A1* | 9/2006 | Takada et al. | 372/46.01 |
| 2006/0219996 A1* | 10/2006 | Yamamoto et al. | 257/12 |
| 2006/0269184 A1* | 11/2006 | Ichioka et al. | 385/2 |
| 2008/0197377 A1* | 8/2008 | Sudo et al. | 257/99 |
| 2008/0240191 A1* | 10/2008 | Takada et al. | 372/44.01 |
| 2008/0260320 A1* | 10/2008 | Laval et al. | 385/2 |
| 2008/0280386 A1* | 11/2008 | Kawasaki et al. | 438/39 |
| 2010/0040322 A1* | 2/2010 | Li et al. | 385/3 |
| 2010/0227170 A1* | 9/2010 | Endo et al. | 428/413 |
| 2010/0244167 A1* | 9/2010 | Konno | 257/432 |
| 2010/0260461 A1* | 10/2010 | Shimizu et al. | 385/130 |
| 2010/0303115 A1* | 12/2010 | Yagi et al. | 372/46.012 |
| 2011/0170161 A1* | 7/2011 | Gill et al. | 359/259 |
| 2011/0308848 A1* | 12/2011 | Ito et al. | 174/260 |
| 2012/0033910 A1* | 2/2012 | Morini et al. | 385/3 |
| 2012/0070156 A1* | 3/2012 | Tanaka et al. | 398/175 |
| 2012/0142129 A1* | 6/2012 | Tsuji | 438/32 |
| 2012/0148184 A1* | 6/2012 | Yoneda et al. | 385/2 |
| 2012/0314725 A1* | 12/2012 | Nakanishi et al. | 372/43.01 |
| 2013/0016939 A1* | 1/2013 | Takagi | 385/3 |

FOREIGN PATENT DOCUMENTS

| | | |
|---|---|---|
| JP | 2012-252290 | 12/2012 |
| JP | 2012252290 A * | 12/2012 |

* cited by examiner

METHOD FOR PRODUCING SEMICONDUCTOR OPTICAL DEVICE AND SEMICONDUCTOR OPTICAL DEVICE

BACKGROUND OF THE INVENTION

1. Field of the Invention

The present invention relates to a method for producing a semiconductor optical device used for optical modulation and a semiconductor optical device.

2. Description of the Related Art

Japanese Unexamined Patent Application Publication No. 2012-252290 discloses a semiconductor Mach-Zehnder modulator used for modulating optical signals.

The Mach-Zehnder modulator disclosed in Japanese Unexamined Patent Application Publication No. 2012-252290 includes an optical waveguide having a high-mesa structure. The optical waveguide includes an n-type InP cladding layer, a quantum well active layer, a p-type InP cladding layer, and a p-type contact layer stacked on an n-type InP substrate. The optical waveguide is covered with a resin. An electrode pad is disposed at a position away from the optical waveguide. The electrode pad is disposed on the resin. A metal interconnection that connects the optical waveguide and the electrode pad passes above another optical waveguide.

SUMMARY OF THE INVENTION

In the Mach-Zehnder modulator disclosed in Japanese Unexamined Patent Application Publication No. 2012-252290, a capacitor is formed between the metal interconnection and a semiconductor conductive layer (p-type semiconductor layer or n-type semiconductor layer) included in the optical waveguide. The capacitor formed between the metal interconnection and a semiconductor conductive layer causes the deterioration of frequency characteristics of the Mach-Zehnder modulator. Therefore, a distance needs to be kept between the metal interconnection and the top surface of the optical waveguide to reduce the parasitic capacitance of the capacitor.

To keep a distance between the metal interconnection and the top surface of the optical waveguide, for example, a thick resin layer may be disposed between the metal interconnection and the optical waveguide. However, use of a thick resin layer makes it difficult to form an electrode on the optical waveguide. Such a thick resin layer causes the ununiformity of the depth of an opening for forming an electrode. If the opening is excessively deep, an electrode is formed not only on the top surface of the optical waveguide but also on the side surface of the optical waveguide. Consequently, a capacitor is formed between the electrode formed on the side surface and the semiconductor conductive layer. Therefore, the parasitic capacitance related to the electrode formed on the side surface is also formed. In the Mach-Zehnder modulator, it is difficult to simultaneously reduce the parasitic capacitance due to the metal interconnection and the parasitic capacitance due to the electrode formed on the side surface as described above.

A method for producing a semiconductor optical device according to an aspect of the present invention includes the steps of (a) forming a first optical waveguide and a second optical waveguide on a principal surface of a substrate; (b) forming a first resin layer on the principal surface of the substrate, on top surfaces of the first and the second waveguides, and on side surfaces of the first and second optical waveguides; (c) forming an opening in the first resin layer on the first optical waveguide; (d) forming a first electrode in a part of the opening, the first electrode being in contact with the top surface of the first optical waveguide through the opening; (e) forming a second resin layer on the first electrode and on the first resin layer, the second resin layer filling the opening; (f) forming a groove by etching the second resin layer until a top surface of the first electrode is exposed; (g) forming a second electrode on the second resin layer, on a side surface of the groove, and on the top surface of the first electrode; and (h) forming a third electrode on the second electrode. The third electrode is configured to fill the groove. The second and third electrodes have a region in which the second and third electrodes pass over the second optical waveguide. In addition, in the region, the first and second resin layers are disposed between the second electrode and the second optical waveguide, the second electrode being separated at a predetermined distance from the top surface of the second optical waveguide.

According to the method for producing a semiconductor optical device, a resin layer constituted by the first resin layer and the second resin layer is disposed on the second optical waveguide. A metal interconnection constituted by the second electrode and the third electrode is disposed on the resin layer. Therefore, the resin layer is disposed between the metal interconnection and the second optical waveguide. Thus, a large distance is provided between the metal interconnection and the second optical waveguide. This suppresses the parasitic capacitance formed between the metal interconnection and the second optical waveguide. Furthermore, the opening is formed after the first resin layer is formed. Therefore, the depth of the opening can be made uniform. Thus, the first electrode is not formed on the side surface of the first optical waveguide. This suppresses the parasitic capacitance formed between the first electrode and the first optical waveguide.

In the method for producing a semiconductor optical device according to the aspect of the present invention, the second resin layer preferably has a thickness larger than a height of the second optical waveguide in the region in which the second and third electrodes pass over the second optical waveguide. According to this production method, the second resin layer is thickly formed. Therefore, the metal interconnection is disposed away from the second optical waveguide.

In the method for producing a semiconductor optical device according to the aspect of the present invention, in the step of forming the first resin layer, the first resin layer preferably has a surface higher than the top surface of the first optical waveguide. The surface of the first resin layer is separated at a predetermined distance from the top surface of the first optical waveguide. The distance between the surface of the first resin layer and the top surface of the first optical waveguide is preferably smaller than one half of the height of the first optical waveguide. According to this production method, since the first resin layer is thin, the ununiformity of the depth of the opening is reduced. Thus, the formation of an electrode on the side surface of the first optical waveguide is avoided.

In the method for producing a semiconductor optical device according to the aspect of the present invention, in the step of forming the groove, the groove preferably has a width smaller than a width of the first electrode at a bottom surface of the groove. According to this production method, the etching of the second resin layer is stopped when the top surface of the first electrode is exposed. Therefore, the second and third electrodes are not formed on the side surface of the first optical waveguide.

In the method for producing a semiconductor optical device according to the aspect of the present invention, in the step of forming the groove, the groove preferably has the side surface being extended in a direction substantially perpendicular to the principal surface of the substrate. According to this production method, the second and third electrodes are formed so as to have a substantially uniform width. Thus, the parasitic capacitance between the second and third electrodes and the first optical waveguide is reduced.

The method for producing a semiconductor optical device according to the aspect of the present invention may further include the steps of before the formation of the second resin layer, forming an insulating layer on the first resin layer and on the first electrode; and after the formation of the groove in the second resin layer, etching the insulating layer using the second resin layer as a mask until the top surface of the first electrode is exposed. According to this production method, an insulating layer is formed between the second resin layer and the first electrode. This increases the adhesion between the second resin layer and the first electrode.

In the method for producing a semiconductor optical device according to the aspect of the present invention, in the step of forming the opening, the opening preferably has a width larger than a width of the first optical waveguide at a bottom surface of the opening. In addition, in the step of forming the first electrode, the first electrode preferably has a width larger than the width of the first optical waveguide. According to this production method, the width of the first electrode can be made uniform.

In the method for producing a semiconductor optical device according to the aspect of the present invention, the second electrode is preferably formed by a sputtering method, and the third electrode is preferably formed by a plating method. According to this production method, the second electrode can be formed on the vertical side surface of the groove. Furthermore, the groove is filled with the third electrode. Thus, the electrode in the groove and the electrode on the second resin layer are connected to each other.

In the method for producing a semiconductor optical device according to the aspect of the present invention, in the step of forming the groove, the groove is preferably extended in a direction parallel to the first optical waveguide, and the side surface of the groove is preferably entirely surrounded by the second resin layer. According to this production method, the second electrode is formed on the side surface of the groove surrounded by the second resin layer. Furthermore, the groove is filled with the third electrode.

A semiconductor optical device according to another aspect of the present invention includes an active waveguide disposed on a principal surface of a substrate; an optical waveguide optically connected to the active waveguide; a first electrode in contact with atop surface of the active waveguide; a first resin layer burying the active waveguide and the optical waveguide; a second resin layer disposed on a surface of the first resin layer, on the active waveguide, and on the optical waveguide, the second resin layer having a groove on the first electrode; a second electrode disposed on the second resin layer and on a side surface of the groove in the second resin layer, the second electrode being electrically connected to the first electrode; and a third electrode disposed on the second electrode, the groove being filled with the third electrode. The second resin layer between the second electrode and the optical waveguide has a thickness larger than a height of the optical waveguide.

According to this semiconductor optical device, the metal interconnection constituted by the second electrode and the third electrode is disposed on a top surface of a resin layer constituted by the first resin layer and the second resin layer. This increases the distance between the metal interconnection and the optical waveguide. Thus, the parasitic capacitance between the metal interconnection and the optical waveguide is reduced. Since the groove that penetrates through the second resin layer is formed on the first electrode, the second and third electrodes are not formed on the side surface of the active waveguide. Thus, the parasitic capacitance between the second and third electrodes and the active waveguide is reduced.

In the semiconductor optical device according to the present invention, the surface of the first resin layer is preferably separated at a predetermined distance from the top surface of the active waveguide. The distance between the surface of the first resin layer and the top surface of the active waveguide may be smaller than one half of the height of the active waveguide. According to this semiconductor optical device, the opening formed in the first resin layer is shallow. Therefore, the depth of the opening can be made uniform. Thus, the formation of the first electrode on the side surface of the active waveguide is prevented.

In the semiconductor optical device according to the present invention, the groove preferably has a width smaller than a width of the first electrode at a bottom portion of the groove. According to this semiconductor optical device, the groove is formed without protruding from a region on the first electrode. Therefore, the formation of the second and third electrodes on the side surface of the active waveguide is avoided.

In the semiconductor optical device according to the present invention, the side surface of the groove is preferably extended in a direction substantially perpendicular to the principal surface of the substrate. According to this semiconductor optical device, the second and third electrodes have a substantially uniform width in the groove. This reduces the parasitic capacitance between the second and third electrodes and the active waveguide.

The semiconductor optical device according to the present invention may further include an insulating layer between the first resin layer and the second resin layer and between the first electrode and the second resin layer. According to this semiconductor optical device, an insulating layer is formed between the second resin layer and the first electrode. Thus, the adhesion between the second resin layer and the first electrode is increased, which prevents the peeling.

DESCRIPTION OF THE PREFERRED EMBODIMENTS

A method for producing a semiconductor optical device and a semiconductor optical device according to embodiments of the present invention will now be described in detail with reference to the attached drawings. In the description of the drawings, the same elements are designated by the same reference numerals, and the description therefor is omitted to avoid redundancy.

First Embodiment

Figure 1:
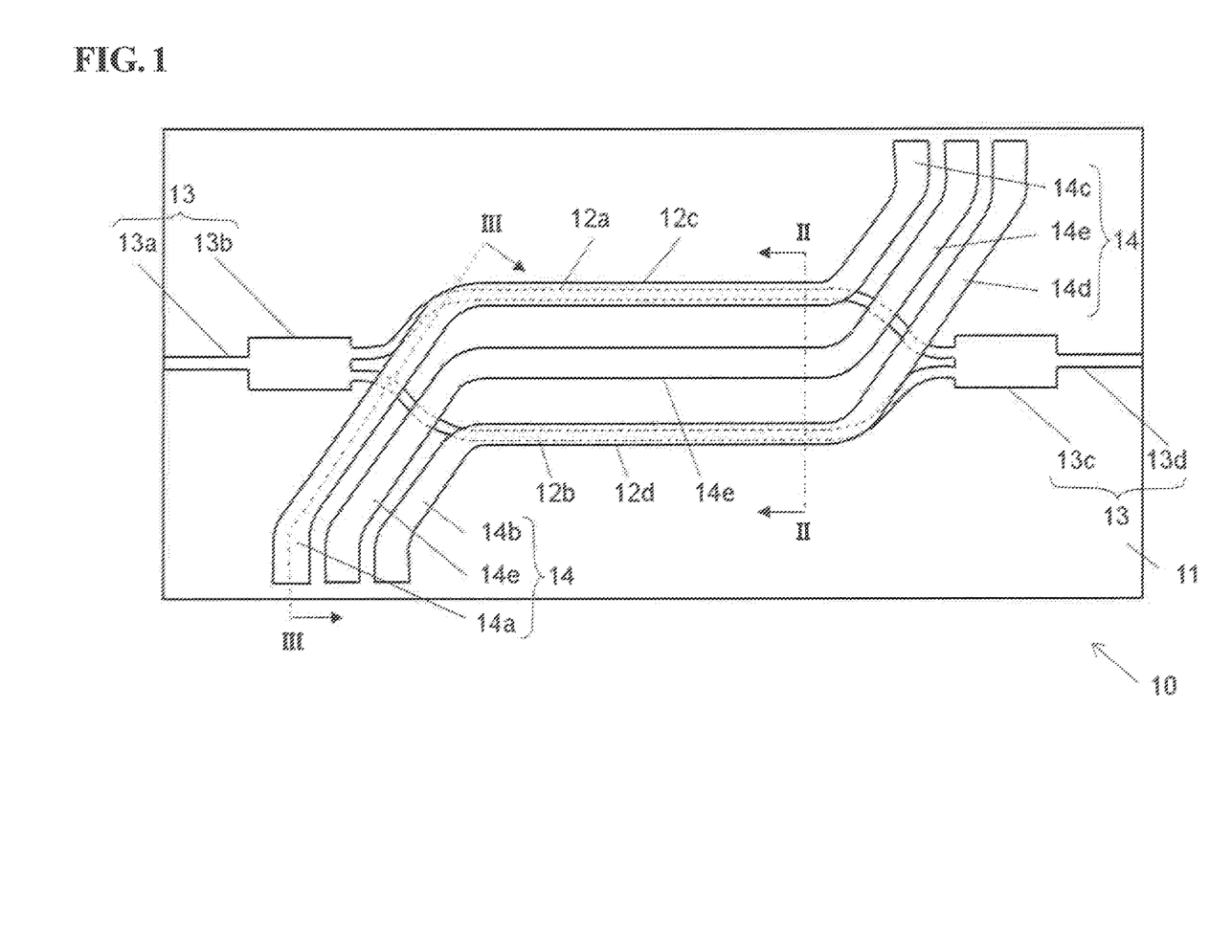
FIG. 1 is a plan view showing a semiconductor optical device according to a first embodiment of the present invention.

FIG. 1 is a plan view showing a semiconductor optical device according to an embodiment of the present invention. A semiconductor optical device 10 includes a substrate 11, active waveguides 12a and 12b, an optical waveguide 13, upper electrodes 12c and 12d, and a metal interconnection 14. The active waveguides 12a and 12b and the optical waveguide 13 are disposed on the substrate 11. The active waveguides 12a and 12b are optically connected to the optical waveguide 13. The optical waveguide 13 includes an input waveguide 13a, optical couplers 13b and 13c, and an output waveguide 13d. The active waveguide 12a is electrically connected to the upper electrode 12c and the active waveguide 12b is electrically connected to the upper electrode 12d. The metal interconnection 14 includes input interconnections 14a and 14b, output interconnections 14c and 14d, and a lower electrode 14e. The input interconnection 14a and the output interconnection 14c are connected to the upper electrode 12c. The input interconnection 14b and the output interconnection 14d are connected to the upper electrode 12d. The lower electrode 14e is disposed between the active waveguides 12a and 12b and is electrically connected to the active waveguides 12a and 12b. The upper electrodes 12c and 12d are in contact with the active waveguides 12a and 12b. The contact length of the upper electrode 12c and the active waveguide 12a is 3 mm. The contact length of the upper electrode 12d and the active waveguide 12b is 3 mm.

The operation of the semiconductor optical device 10 will be described. Light is input to the input waveguide 13a and branched into the active waveguides 12a and 12b by the optical coupler 13b. Electrical signals are input to the input interconnections 14a and 14b. The electrical signals are applied to the active waveguides 12a and 12b through the upper electrodes 12c and 12d, respectively. As a result of the application of the electrical signals, light guided in the active waveguides 12a and 12b is modulated. The modulated light is multiplexed in the optical coupler 13c and output from the output waveguide 13d as signal light.

Figure 2:
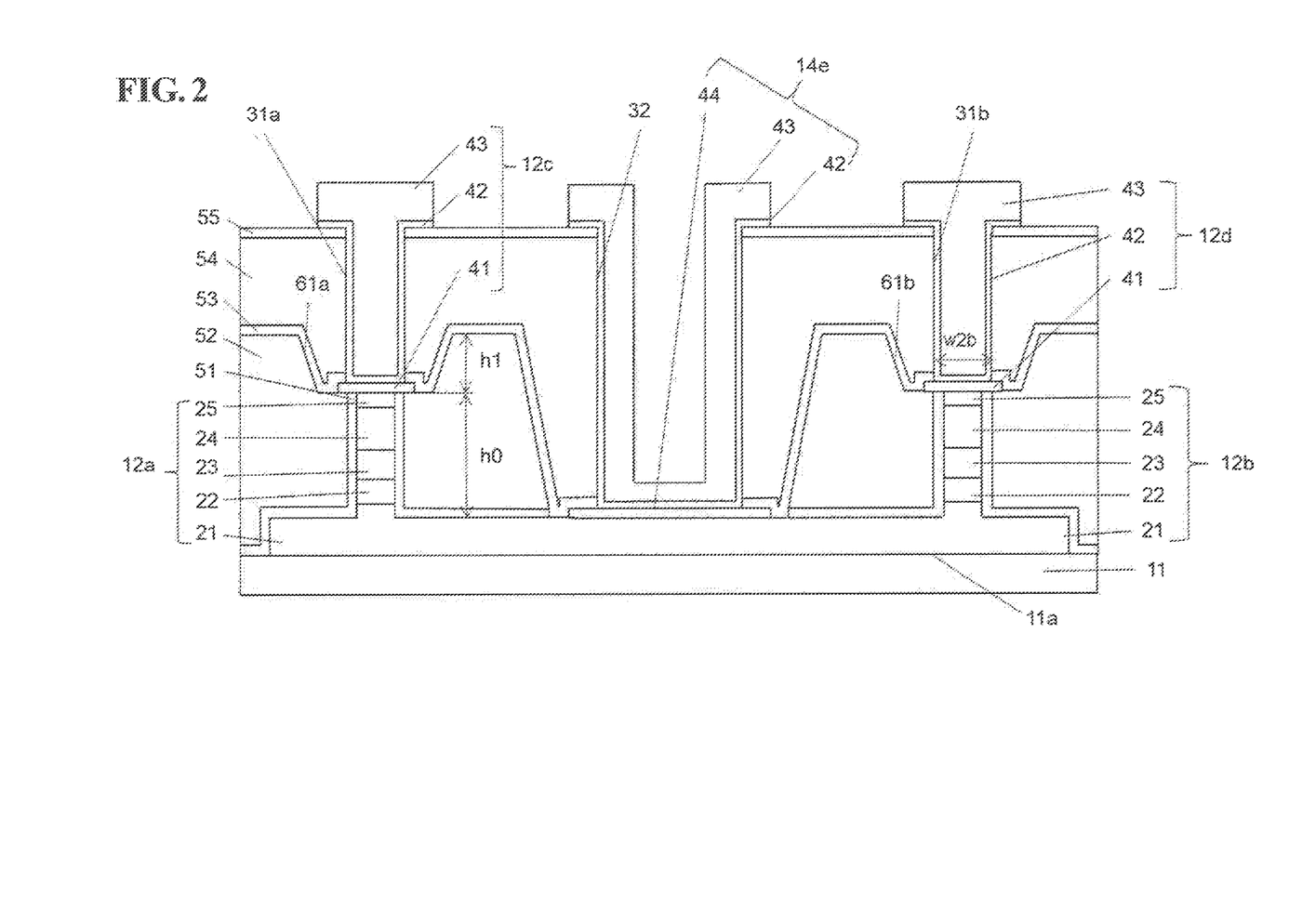
FIG. 2 is a sectional view showing the semiconductor optical device according to the first embodiment of the present invention.

FIG. 2 is a sectional view taken along line II-II of FIG. 1. The active waveguides 12a and 12b are disposed on a principal surface 11a of the substrate 11. The active waveguides 12a and 12b each include a lower contact layer 21, a lower cladding layer 22, a core layer 23, an upper cladding layer 24, and an upper contact layer 25. The upper electrode 12c is disposed on the active waveguide 12a. The upper electrode 12d is disposed on the active waveguide 12b. The upper electrodes 12c and 12d are each constituted by a first electrode 41, a second electrode 42, and a third electrode 43. The lower electrode 14e is disposed between the active waveguides 12a and 12b. The lower electrode 14e is constituted by the second electrode 42, the third electrode 43, and a fourth electrode 44. Electrical signals are applied to the upper cladding layers 24, the core layers 23, and the lower cladding layers 22 through the upper electrodes 12c and 12d and the lower electrode 14e.

The substrate 11 is composed of, for example, semi-insulating InP. The lower contact layer 21 is an n-type InP layer doped with Si and has a thickness of 0.6 μm. Each of the lower cladding layers 22 is composed of n-type InP doped with Si and has a thickness of 0.6 μm. Each of the core layers 23 has a multi quantum well (MQW) structure in which GaInAsP and InP are alternately stacked and has a thickness of 0.3 μm. Each of the upper cladding layers 24 is composed of p-type InP doped with Zn and has a thickness of 1.3 μm. Each of the upper contact layers 25 is composed of p-type InGaAs doped with Zn and has a thickness of 0.2 μm. The active waveguides 12a and 12b have a width of for example, 1.5 μm. The active waveguides 12a and 12b have a height defined as "h0". The height h0 is, for example, 2.5 μm.

The side surfaces of the active waveguides 12a and 12b are each covered with a first insulating layer 51. The first insulating layer 51 is, for example, a SiO$_2$ layer having a thickness of 0.2 μm. The surface of the first insulating layer 51 is covered with a first resin layer 52. The first resin layer 52 is composed of, for example, benzocyclobutene (BCB) resin. The top surface of the first resin layer 52 is located higher than the top surfaces of the active waveguides 12a and 12b. The distance between the top surface of the first resin layer 52 and the top surfaces of the active waveguides 12a and 12b is defined as "h1". The distance h1 is preferably smaller than one half of the height h0. When the height h0 is 2.5 μm, the distance h1 is, for example, 1 μm. An opening is disposed on the active waveguides 12a and 12b. A first electrode 41 is disposed in the opening. Herein, since the distance h1 is small, the opening is shallow. This shallow opening reduces the ununiformity of the depth of the opening. Thus, the first electrode 41 is not formed on the side surfaces of the active waveguides 12a and 12b. This reduces the parasitic capacitance between the first electrode 41 and each of the active waveguides 12a and 12b. Consequently, the modulation characteristics of the semiconductor optical device 10 (optical modulator) in a high-frequency region are improved.

The first electrode 41 is in contact with each of the top surfaces of the active waveguides 12a and 12b. For example, the first electrode 41 has a thickness of 0.6 μm, a width of 4 μm, and a length of 3 mm. The first electrode 41 is a metal film including three layers of Ti/Pt/Au. A second insulating layer 53, a second resin layer 54, and a third insulating layer 55 are disposed on the first electrode 41. The second insulating layer 53 and the third insulating layer 55 are composed of SiO$_2$ and have a thickness of 0.3 μm. The second resin layer 54 is composed of BCB resin.

Grooves 31a and 31b are formed so as to penetrate through the second insulating layer 53, the second resin layer 54, and the third insulating layer 55. The grooves 31a and 31b each have a side surface that extends in a direction substantially perpendicular to the principal surface 11a of the substrate 11. The width w2b of the bottom surface of each of the grooves 31a and 31b is about 2 μm. The grooves 31a and 31b have a depth of about 4 μm and a length of 2.9 mm. The length of the grooves 31a and 31b is smaller than that of the first electrode 41. The grooves 31a and 31b are disposed along the active waveguides 12a and 12b and terminated on the active waveguides 12a and 12b, respectively. The side surface of each of the grooves 31a and 31b is entirely surrounded by the second resin layer 54. A second electrode 42 and a third electrode 43 are disposed in each of the grooves 31a and 31b. The side surface of each of the grooves 31a and 31b is covered with the second electrode 42. The second electrode 42 is composed of TiW and has a thickness of, for example, 0.05 μm. An inner space defined by the second electrode 42 is filled with the third electrode 43. The third electrode 43 is composed of Au and has a thickness of, for example, 3.5 μm.

The side surfaces of the grooves 31a and 31b are extended in a direction substantially perpendicular to the principal surface 11a of the substrate 11. Thus, the second electrode 42 and the third electrode 43 each have the substantially uniform width and shape in the grooves 31a and 31b. That is, the second electrode 42 and the third electrode 43 each have an elongated shape. This can reduce the parasitic capacitance between the second and third electrodes 42 and 43 and the active waveguides 12a and 12b. The width w2b of the bottom surface of each of the grooves 31a and 31b is smaller than the width of the first electrode 41. That is, the grooves 31a and 31b do not protrude from a region on the first electrode 41. Thus, the second and third electrodes 42 and 43 are not formed on the side surfaces of the active waveguides 12a and 12b.

The second insulating layer 53 covers the edges of the first electrode 41 at the bottom surface of each of the grooves 31a and 31b. The second insulating layer 53 covers the edges of the first electrode 41 so as to extend over a distance of, for example, 1 μm. Thus, the second resin layer 54 is in contact with the second insulating layer 53, but is not in contact with the first electrode 41. Insulating layers have higher adhesion to electrodes than resin layers. Therefore, the second resin layer 54 is not easily peeled off from the first electrode 41 at the edges of the first electrode 41 covered with the second insulating layer 53. Furthermore, the third insulating layer 55 is disposed on the surface of the second resin layer 54. This improves the adhesion between the second electrode 42 and a base of the second electrode 42.

A lower opening 32 is formed between the active waveguides 12a and 12b. The lower opening 32 is formed so as to penetrate through the second insulating layer 53, the second resin layer 54, and the third insulating layer 55. A fourth electrode 44 is disposed at the bottom the lower opening 32. The fourth electrode 44 is in contact with the lower contact layer 21. The fourth electrode 44 is composed of an AuGeNi alloy and has a thickness of 0.3 μm. The fourth electrode 44 has a width of 20 μm. The second electrode 42 and the third electrode 43 are disposed along the side surface of the lower opening 32. The fourth electrode 44, the second electrode 42, and the third electrode 43 constitute the lower electrode 14e. The lower opening 32 has a width of 16 μm. The second insulating layer 53 covers the edges of the fourth electrode 44. The width of a portion of the second insulating layer 53 that covers each edge is 2 μm. By covering the edges with the second insulating layer 53, the adhesion between the fourth electrode 44 and the second resin layer 54 is improved.

Figure 3:
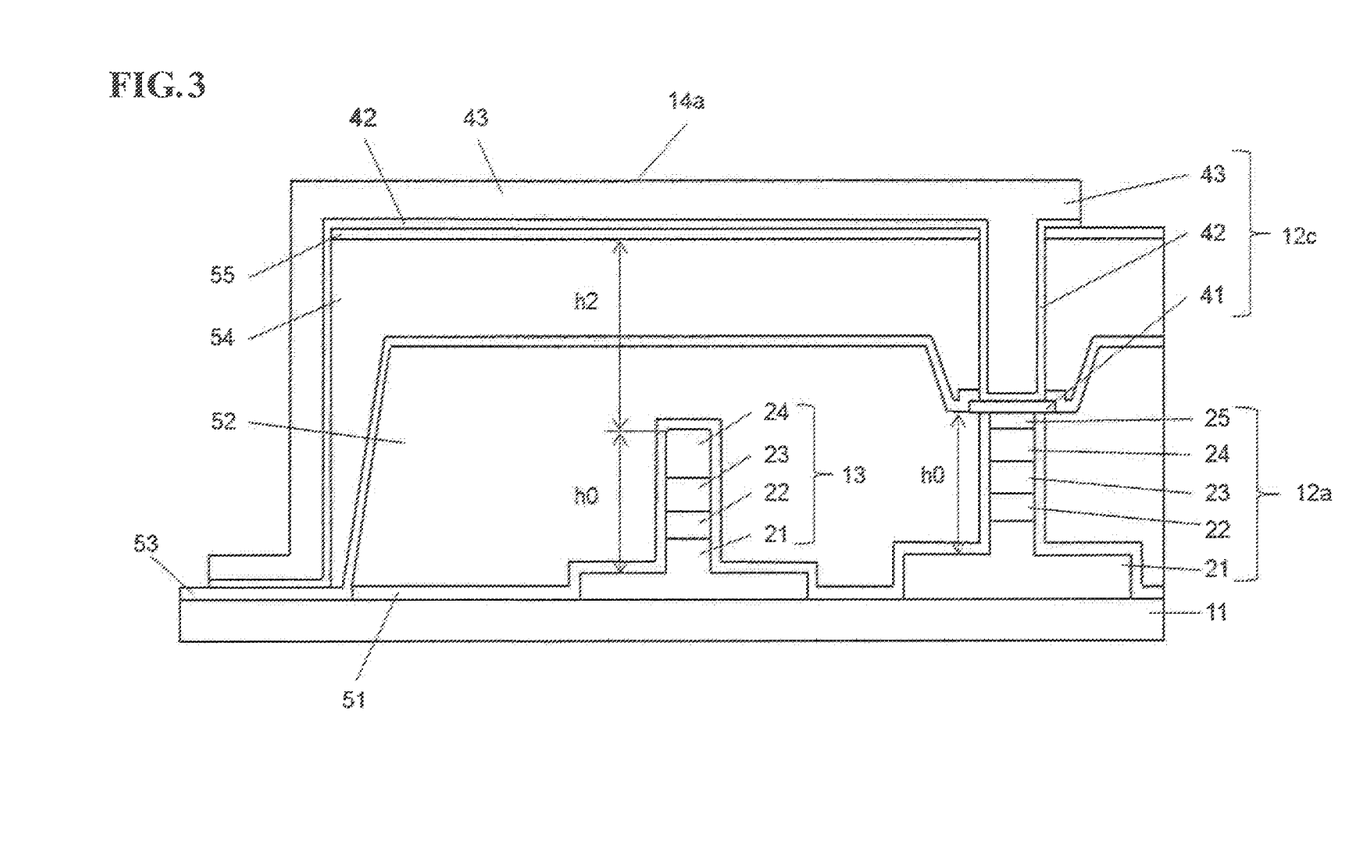
FIG. 3 is a sectional view showing the semiconductor optical device according to the first embodiment of the present invention.

FIG. 3 is a sectional view taken along line III-III of FIG. 1. The input interconnection 14a is constituted by the second electrode 42 and the third electrode 43. The input interconnection 14a has one end disposed on the second insulating layer 53 that is in contact with the substrate 11. At the one end of the input interconnection 14a, the first resin layer 52 is removed and the second resin layer 54 is also removed. The one end of the input interconnection 14a is used as an electrode pad for wire bonding. The electrode pad has a width of 100 μm. As a resin layer is not disposed below the electrode pad, the adhesion between the electrode pad and the substrate 11 is improved.

The input interconnection 14a is disposed on the surface of the second resin layer 54 and on the third insulating layer 55. The input interconnection 14a has a region in which the input interconnection 14a passes over the optical waveguide 13. In that region, the first insulating layer 51, the first resin layer 52, the second insulating layer 53, the second resin layers 54, and the third insulating layer 55 are disposed between the input interconnection 14a and the optical waveguide 13. The distance between the top surface of the second resin layer 54 and the substrate 11 is 7 μm. The input interconnection 14a has a width of 30 μm. The input interconnection 14a has the other end that is connected to the upper electrode 12c.

The optical waveguide 13 includes the lower contact layer 21, the lower cladding layer 22, the core layer 23, and the upper cladding layer 24. The optical waveguide 13 has a width of, for example, 1.5 μm and a height of, for example, 2.5 μm. The optical waveguide 13 has the same height as the height h0 of the active waveguides 12a and 12b because the optical waveguide 13 and the active waveguides 12a and 12b are formed in a same etching step. The distance between the top surface of the second resin layer 54 and the top surface of the optical waveguide 13 is defined as "h2". The distance h2 is larger than the height h0 of the optical waveguide 13. In this embodiment, the distance h2 is 4.5 μm. Since the distance between the input interconnection 14a and the optical waveguide 13 is large, the parasitic capacitance is reduced.

FIGS. 4A to 8B are diagrams for describing a method for producing a semiconductor optical device according to the first embodiment of the present invention.

A lower contact layer 21, a lower cladding layer 22, a core layer 23, an upper cladding layer 24, and an upper contact layer 25 are grown on a principal surface 11a of a substrate 11. These layers are grown by an organo-metallic vapor phase epitaxy (OMVPE) method. Subsequently, the upper contact layer 25 is partially removed by wet etching in a region in which an optical waveguide 13 is to be formed.

Figure 4A:
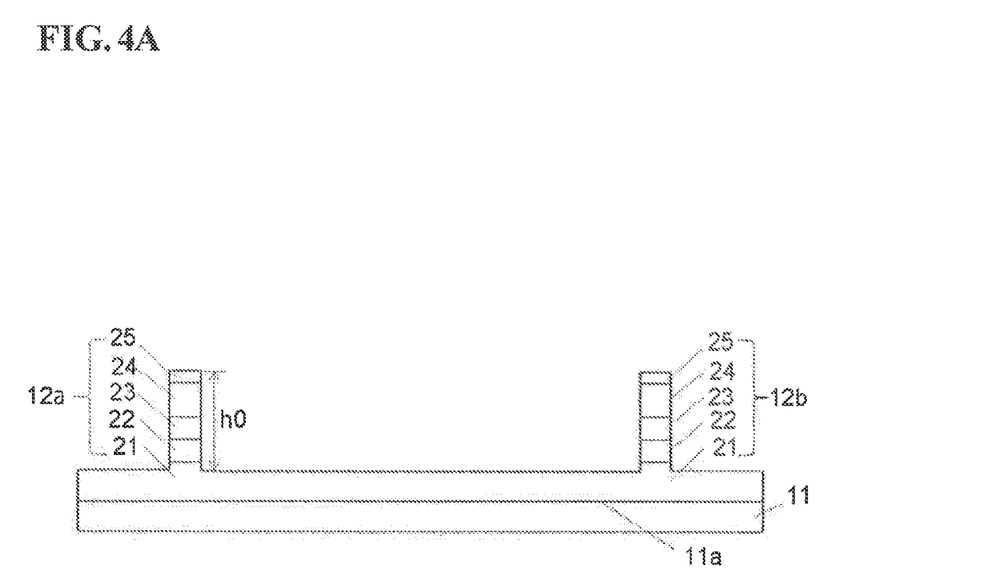
FIGS. 4A and 4B are diagrams for describing a method for producing a semiconductor optical device according to the first embodiment of the present invention.

The layers are dry-etched using $Cl_2$ gas, HI gas, or the like. Consequently, mesa-shaped active waveguides 12a and 12b are formed as shown in FIG. 4A. The active waveguides 12a and 12b have a width of 1.5 μm and a height h2 of 2.5 μm. The optical waveguide 13 is also formed by the same etching step.

Figure 4B:
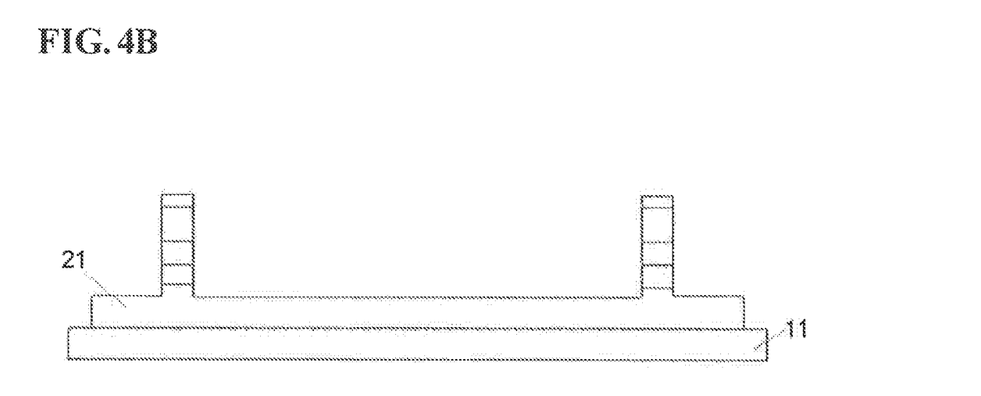

Subsequently, the lower contact layer 21 is dry-etched. As shown in FIG. 4B, the substrate 11 is exposed at both ends of the lower contact layer 21. Thus, a plurality of semiconductor optical devices 10 to be produced on the substrate 11 are electrically isolated from each other.

Figure 5A:
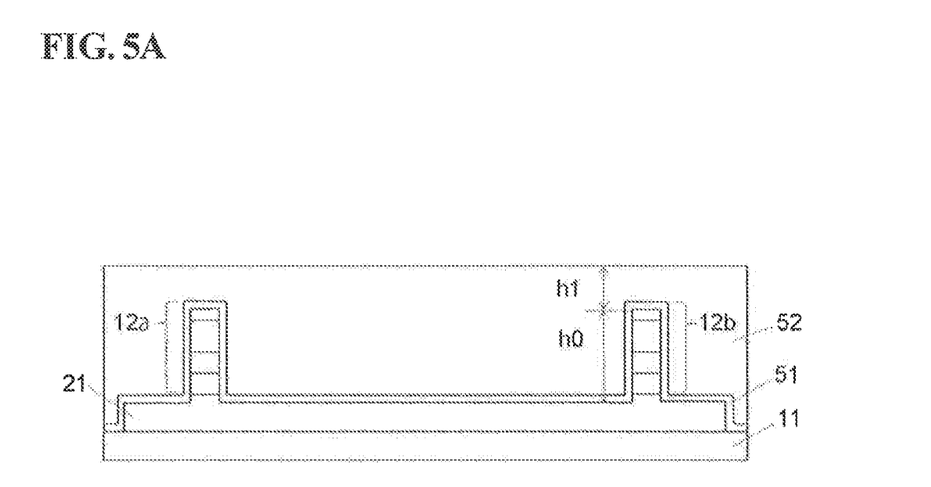
FIGS. 5A and 5B are diagrams for describing the method for producing a semiconductor optical device according to the first embodiment of the present invention.

Subsequently, as shown in FIG. 5A, a first insulating layer 51 and a first resin layer 52 are formed. The first insulating layer 51 is formed so as to cover the active waveguides 12a and 12b, the lower contact layer 21, and the substrate 11. The first insulating layer 51 is composed of, for example, $SiO_2$. The first insulating layer 51 has a thickness of 0.2 μm. The first insulating layer 51 is formed by a chemical vapor deposition (CVD) method. The first resin layer 52 is formed on the first insulating layer 51. The first resin layer 52 is formed by a spin coating method. The first resin layer 52 is composed of, for example, BCB resin. The thickness of the first resin layer 52 is controlled by adjusting the rotational speed in the spin coating and the viscosity of the resin. The first resin layer 52 has such a thickness that the top surface of the first resin layer 52 is located higher than the top surfaces of the active waveguides 12a and 12b. The active waveguides 12a and 12b and the optical waveguide 13 are buried under the first resin layer 52. The distance between the top surface of the first resin layer 52 and the top surfaces of the active waveguides 12a and 12b is defined as "h1". The thickness of the first resin layer 52 is set so that the distance h1 is smaller than one half of the height h0 of the active waveguides 12a and 12b. Thus, the ununiformity of etch depth is reduced in a step of etching the first resin layer 52.

Figure 5B:
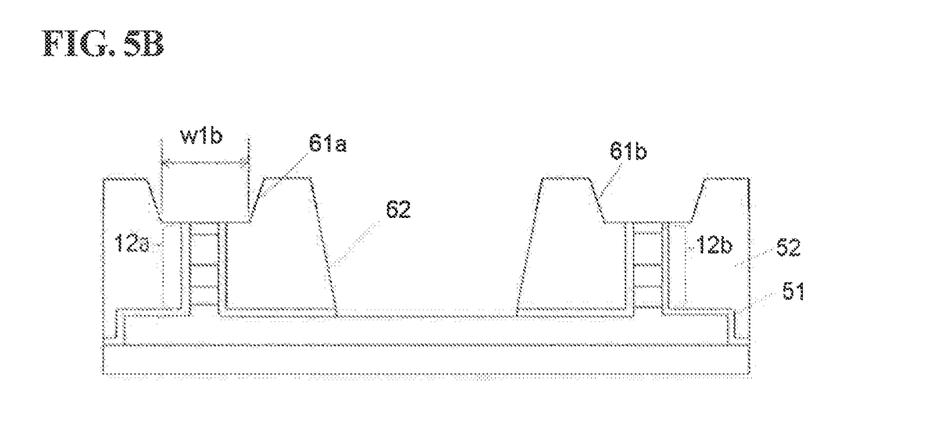

Subsequently, as shown in FIG. 5B, first upper openings 61a and 61b and a first lower opening 62 are formed. The first resin layer 52 is dry-etched using a first resist mask to form the first upper openings 61a and 61b. The first resist mask has openings on the active waveguides 12a and 12b. A mixture gas of $CF_4$ and $O_2$ is used in this dry-etching. Thus, the first insulating layer 51 is exposed on the active waveguides 12a and 12b. Before this dry etching is performed, an etching rate for the first resin layer 52 is measured using a test sample to avoid over-etching. An etching time necessary for exposing the first insulating layer 51 is calculated using the etching rate. The etching of the first resin layer 52 is stopped after the calculated etching time is passed.

The exposed first insulating layer 51 is dry-etched using $CF_4$ gas. In this etching, the first resin layer 52 is also etched at the same time. The etching conditions are selected so that the etching rate for the first insulating layer 51 is substantially equal to that for the first resin layer 52. Thus, the top surfaces of the first insulating layer 51, the first resin layer 52, and the upper contact layer 25 are made flat at the bottom surfaces of the first upper openings 61a and 61b.

The width w1b of the bottom surface of each of the first upper openings 61a and 61b is 6 μm. The width w1b is preferably 5 atm to 10 μm. If the width w1b is less than 5 μm, it is difficult to control the width of a first electrode 41 in a step performed later, if the width w1b is more than 10 μm, a recess is formed on the surface of a second resin layer 54 in a step performed later. The recess makes it difficult to control the width of grooves 31a and 31b.

The width w1b of the bottom surface of each of the first upper openings 61a and 61b is larger than the width of the active waveguides 12a and 12b. Therefore, if an over-etching of the first resin layer 52 is caused, the side surfaces of the active waveguides 12a and 12b are exposed. In a step performed later, a first electrode 41 is formed on the exposed side surfaces of the active waveguides 12a and 12b. Consequently, the parasitic capacitance related to the first electrode 41 formed on the side surfaces is formed. The parasitic capacitance causes an unfavorable deterioration in the frequency characteristics of the semiconductor optical device 10 (modulator). If the depth of over-etching is larger than about one tenth of the height of the active waveguide, the characteristics of the modulator markedly degrade. Therefore, the etch depth of the first resin layer 52 needs to be carefully controlled.

The etching rate is not necessarily uniform in an etching chamber for dry-etching. When the etching is stopped with reference to an low etching rate, an over-etching of an active waveguide occurs in other places of the etching chamber with higher etching rates.

In this embodiment of the present invention, the etch depth of the first resin layer 52 is the distance h1, which is smaller than half the height h0 of the active waveguide. Even if the etching rate has a variation of, for example, 10%, the depth of over-etching is as small as one twentieth of the height h0 or less because the etch depth is small. The depth of over-etching is sufficiently smaller than the depth at which the characteristics of the modulator markedly degrade.

Subsequently, a second resist mask is formed on the surface of the first resin layer 52 to form the first lower opening 62. The second resist mask has an opening in an area between the active waveguides 12a and 12b. In addition, the resist mask has an opening in areas where electrode pads are to be disposed. The first resin layer 52 is dry-etched using a mixture gas of $CF_4$ and $O_2$. The dry etching is stopped when the first insulating layer 51 is exposed. The exposed first insulating layer 51 is removed by dry etching that uses $CF_4$ gas.

Figure 6A:
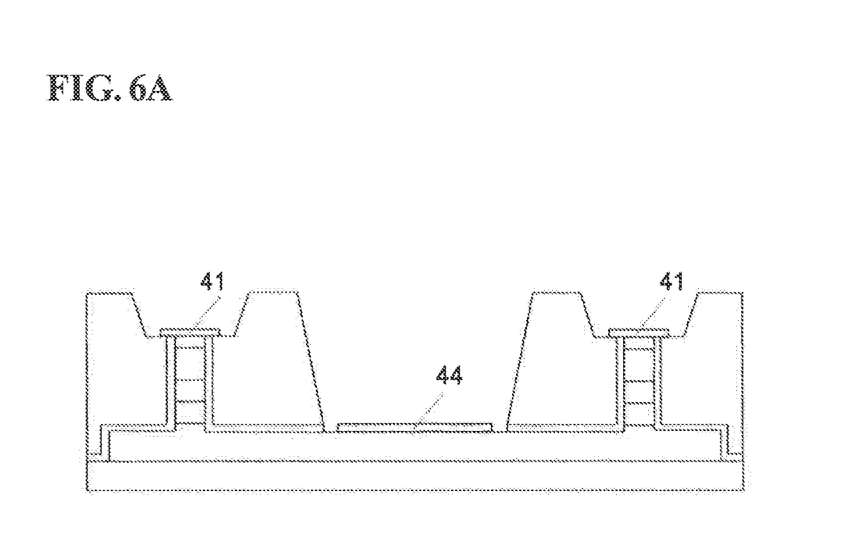
FIGS. 6A and 6B are diagrams for describing the method for producing a semiconductor optical device according to the first embodiment of the present invention.

Subsequently, a resist mask for first lift-off is formed by photolithography. The resist mask for first lift-off has openings in the first upper openings 61a and 61b. A metal film composed of Ti/Pt/Au is deposited by an evaporation method. After the resist mask for first lift-off is removed, first electrodes 41 are formed as shown in FIG. 6A. The first electrodes 41 have a width of 4 μm and a thickness of 0.6 μm. A resist mask for second lift-off is then formed. The resist mask for second lift-off has an opening in the first lower opening 62. A metal film composed of an AuGeNi alloy is deposited by an evaporation method. After the resist mask for second lift-off is removed, a fourth electrode 44 is formed as shown in FIG. 6A. The fourth electrode 44 has a width of 20 μm and a thickness of 0.3 μm.

Figure 6B:
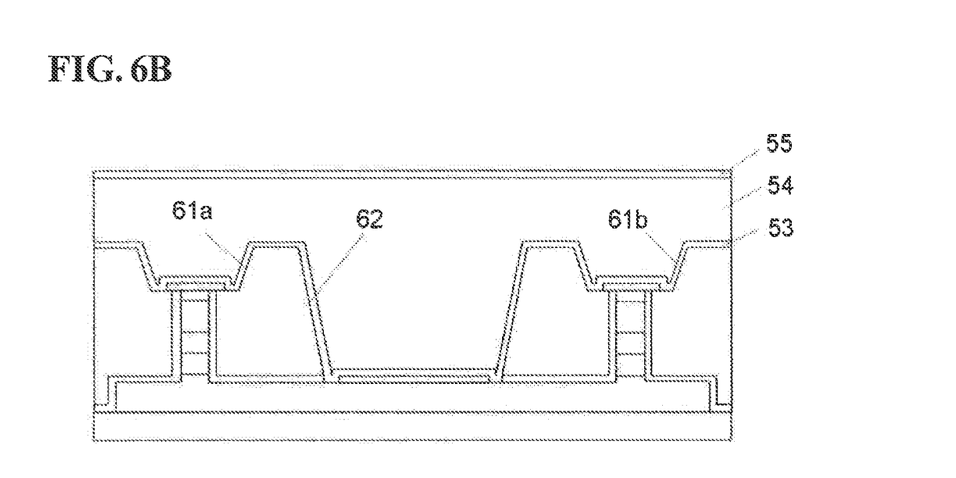

Subsequently, a second insulating layer 53 is deposited by a sputtering method. The second insulating layer 53 is composed of $SiO_2$ and has a thickness of 0.3 μm. A second resin layer 54 is then formed by a spin coating method. The second resin layer 54 is composed of BCB resin. The second resin layer 54 has a thickness of 3 μm on the optical waveguide 13. As shown in FIG. 6B, the first upper openings 61a and 61b and the first lower opening 62 are filled with the second resin layer 54. The first electrodes 41 and the fourth electrode 44 are also buried under the second resin layer 54. A third insulating layer 55 is deposited on the second resin layer 54 by a sputtering method. The third insulating layer 55 is composed of $SiO_2$ and has a thickness of 0.3 μm. The formation of the third insulating layer 55 improves the adhesion between a second electrode 42 and a base of the second electrode 42. The distance between the top surface of the second resin layer 54 and the top surface of the optical waveguide 13 is defined as "h2" (refer to FIG. 3). The thickness of the second resin layer 54 is selected so that the distance h2 is larger than the height h0 of the optical waveguide 13. In this embodiment, when the height h0 is 2.5 μm, the distance h2 is 4.5 μm. Thus, the formation of the parasitic capacitance due to the second and third electrodes 42 and 43 is prevented in a region on the optical waveguide 13.

Figure 7A:
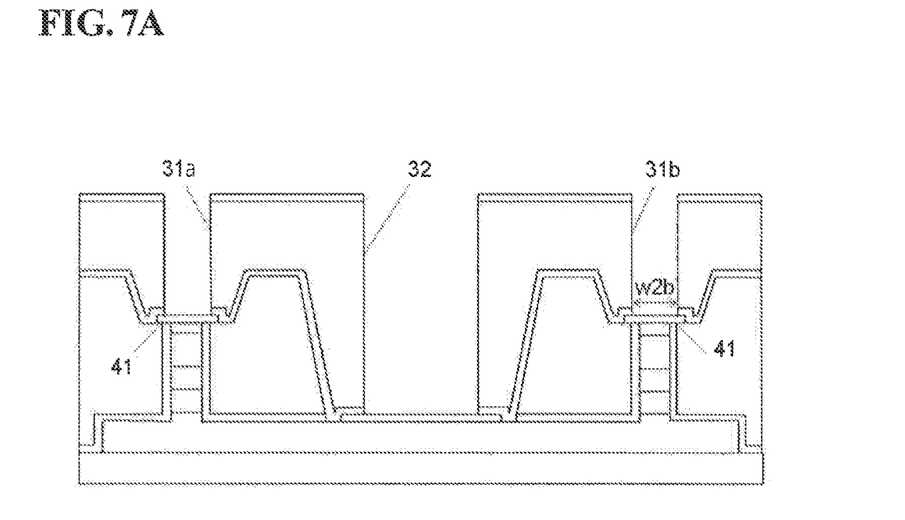
FIGS. 7A and 7B are diagrams for describing the method for producing a semiconductor optical device according to the first embodiment of the present invention.

Subsequently, a third resist mask is formed on the third insulating layer 55. The third resist mask has openings on the first electrodes 41. The width of the openings of the third resist mask is smaller than that of the first electrodes 41. The third insulating layer 55, the second resin layer 54, and the second insulating layer 53 are dry-etched using the resist mask. The dry etching is performed using a mixture gas of $CF_4$ and $O_2$. As shown in FIG. 7A, grooves 31a and 31b are formed. The width w2b of the bottom surface of each of the grooves 31a and 31b is 2 μm.

The dry etching for the grooves 31a and 31b is performed under such conditions that an ion density is high and a directivity of ions is also high. For example, inductive coupled plasma reactive ion etching (ICP-RIE) can be employed. By employing ICP-RIE, the grooves 31a and 31b are formed so that the side surfaces of the grooves 31a and 31b have an angle substantially perpendicular to the principal surface 11a of the substrate 11. The angle between the side surfaces of the grooves 31a and 31b and the principal surface 11a is, for example, 88 degrees. The width in upper portions of the grooves is larger than that in lower portions of the grooves.

The etching gas has a low etching rate for the first electrodes 41. Therefore, the first electrodes 41 are hardly etched and the dry etching stops at the surfaces of the first electrodes 41. Consequently, the etch depth is made uniform even when the etching rate varies. The width w2b of the grooves 31a and 31b is smaller than the width of the first electrodes 41. Thus, grooves are not formed on the side surfaces of the active waveguides 12a and 12b. In a step performed later, a second electrode 42 and a third electrode 43 are not formed on the side surfaces of the active waveguides 12a and 12b.

The width w2b of the grooves 31a and 31b is smaller than the width of the first electrodes 41. Thus, the second insulating layer 53 is left on the edges of each first electrode 41. This provides a structure in which the edges of the first electrode 41 are covered with the second insulating layer 53. Since both edges of the first electrode 41 are covered with the second insulating layer 53, the second resin layer 54 is not in contact with the first electrode 41. Thus, the second resin layer 54 is not easily peeled off from the first electrode 41.

The side surfaces of the grooves 31a and 31b have an angle substantially perpendicular to the principal surface 11a. This prevents the generation of the parasitic capacitance between the second and third electrodes 42 and 43 formed in the grooves 31a and 31b and the active waveguides 12a and 12b. The angle between the side surfaces and the principal surface 11a is preferably 75 to 90 degrees.

A fourth resist mask is formed on the third insulating layer 55. The fourth resist mask has openings on the fourth electrode 44. In addition, the fourth resist mask has an opening in an area where electrode pads are to be disposed. The width of the opening on the fourth electrode 44 is smaller than that of the fourth electrode 44. The third insulating layer 55, the second resin layer 54, and the second insulating layer 53 are dry-etched using the fourth resist mask. The dry etching is performed using a mixture gas of $CF_4$ and $O_2$. Consequently, a lower opening 32 is formed as shown in FIG. 7A. The width of the bottom surface of the lower opening 32 is 16 μm.

In the area where electrode pads are to be disposed, the third insulating layer 55 and the second resin layer 54 are removed by dry etching. In this area, the second insulating layer 53 is exposed.

Figure 7B:
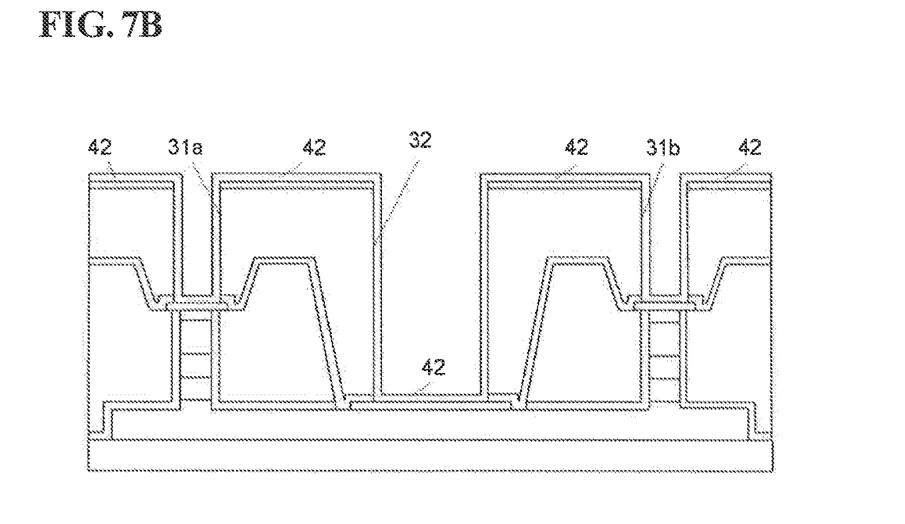

Subsequently, a second electrode 42 is deposited by a sputtering method. The second electrode 42 is composed of TiW and has a thickness of 0.05 μm. As shown in FIG. 7B, the second electrode 42 is deposited so as to cover the third insulating layer 55, the second resin layer 54, the first electrodes 41, and the fourth electrode 44. The side surfaces of the grooves 31a and 31b extend in a substantially vertical direction. By employing a sputtering method, the second electrode 42 can be appropriately deposited on the substantially vertical side surfaces of the grooves 31a and 31b.

Figure 8A:
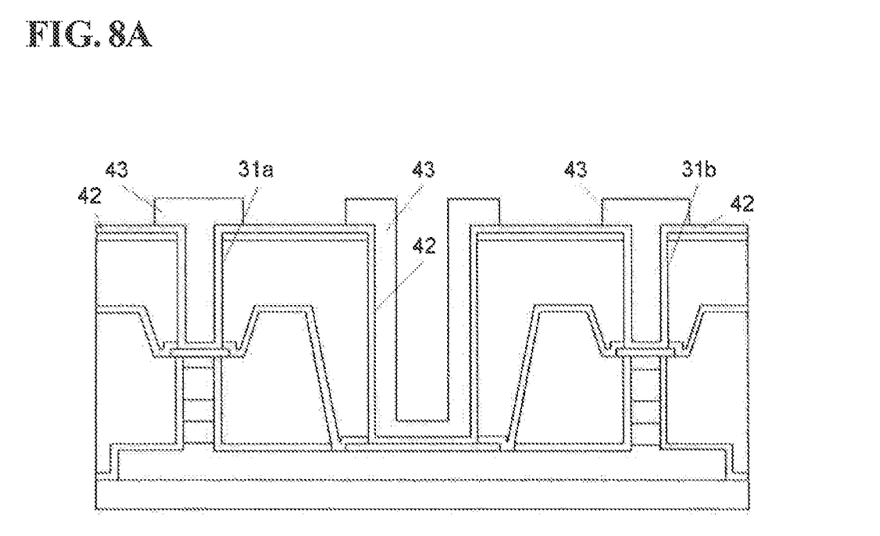
FIGS. 8A and 8B are diagrams for describing the method for producing a semiconductor optical device according to the first embodiment of the present invention.

Subsequently, plating is performed using a resist mask for plating. The resist mask for plating has openings in regions corresponding to the grooves 31a and 31b and the lower opening 32. The resist mask for plating has an opening in an area where electrode pads are to be disposed. A third electrode 43 is plated on a portion of the second electrode 42 which is not covered with the resist mask for plating. The third electrode 43 is also plated on a portion of the fourth electrode 44 which is not covered with the resist mask for plating. The third electrode 43 is composed of Au and has a thickness of 3.5 μm. The width of the grooves 31a and 31b is smaller than the thickness of the plated third electrode 43. Thus, the grooves 31a and 31b are filled with the third electrode 43. After the third electrode 43 is formed, the resist mask for plating is removed. The third electrode 43 is formed as shown in FIG. 8A.

Figure 8B:
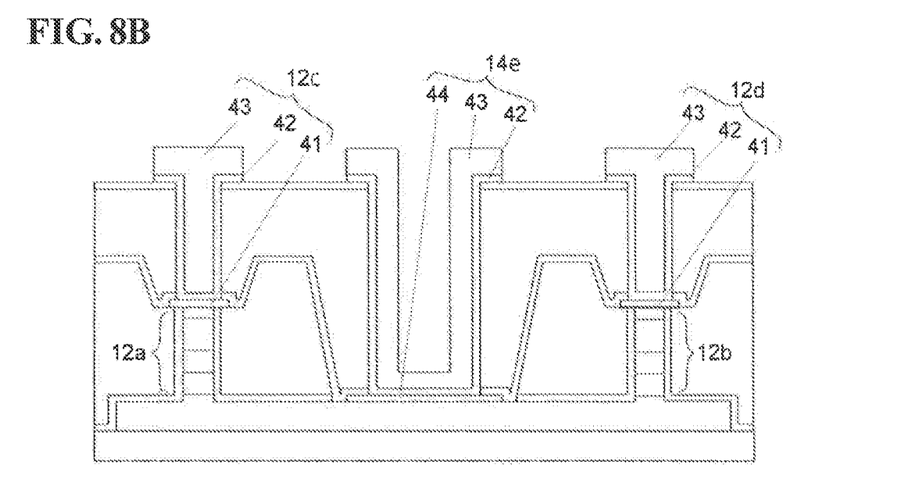

Subsequently, the second electrode 42 is removed by an ion milling method. The ion milling method is performed using argon ions. A portion of the second electrode 42 which is not covered with the third electrode 43 is removed. Another portion of the second electrode 42 which is covered with the third electrode 43 is left. As shown in FIG. 8B, the upper electrodes 12c and 12d constituted by the first electrode 41, the second electrode 42 and the third electrode 43 are obtained. In addition, the metal interconnection 14 constituted by the second electrode 42 and the third electrode 43 is obtained. Herein, the metal interconnection 14 includes input interconnections 14a and 14b, output interconnections 14c and 14d, and a lower electrode 14e (refer to FIG. 1).

In the method for producing a semiconductor optical device 10 according to this embodiment, the distance between the optical waveguide 13 and the metal interconnection 14 increases as described above. Furthermore, no electrodes are formed on the side surfaces of the active waveguides 12a and 12b. Accordingly, a modulator having low parasitic capacitance and good characteristics is provided.

Second Embodiment

Figure 9:
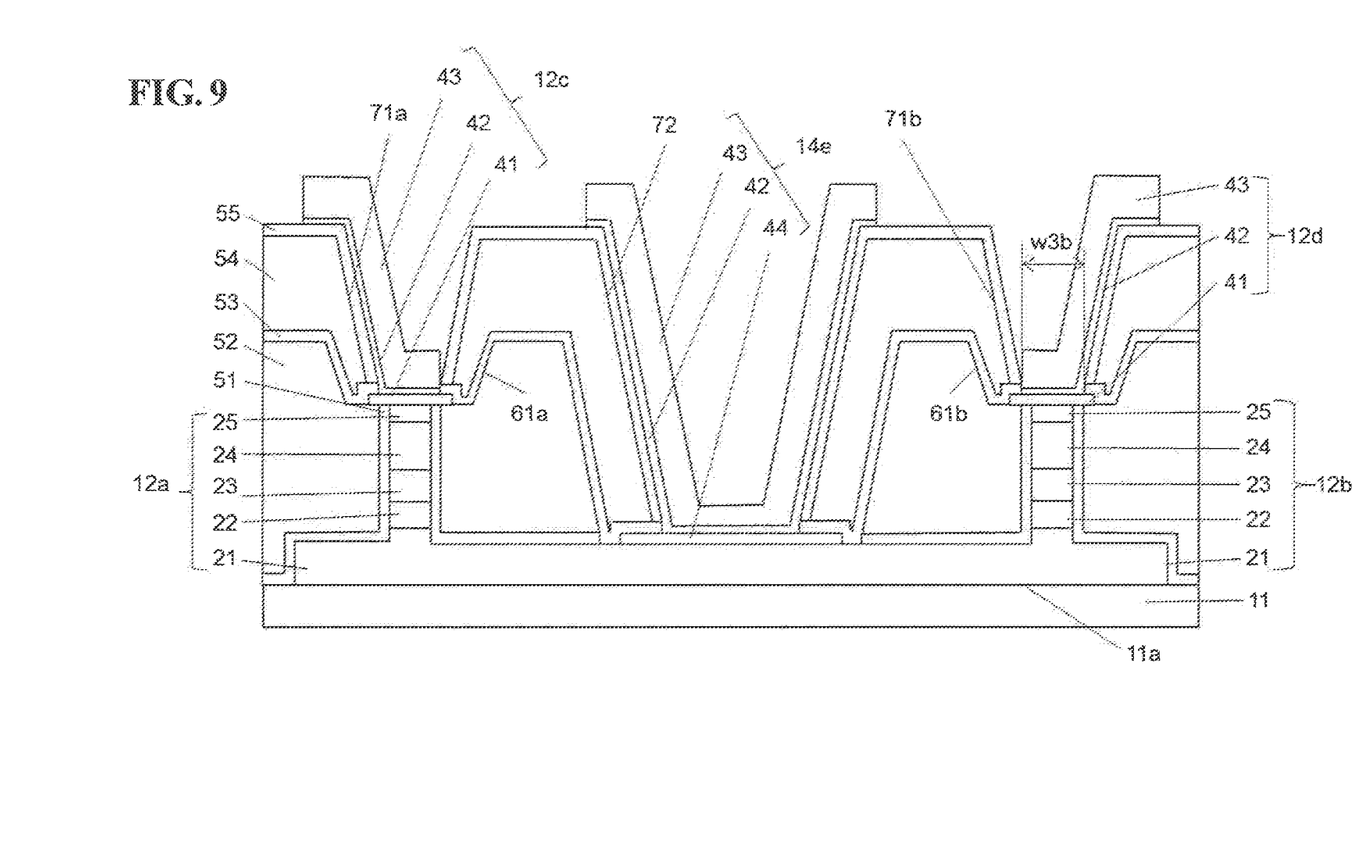
FIG. 9 is a sectional view showing a semiconductor optical device according to a second embodiment of the present invention.

The same structures as in the first embodiment and the same parts in the production method as in the first embodiment are designated by the same reference numerals, and the description thereof is omitted. FIG. 9 is a sectional view showing a semiconductor optical device according to a second embodiment of the present invention. FIG. 9 is a sectional view taken along line II-II of FIG. 1.

The first electrode 41 is disposed so as to be in contact with the top surface of each of the active waveguides 12a and 12b. The second insulating layer 53, the second resin layer 54, and the third insulating layer 55 are disposed on the first electrode 41. In the second embodiment, second upper openings 71a and 71b are formed, instead of the grooves 31a and 31b of the first embodiment. The side surfaces of the second upper openings 71a and 71b are different from the side surfaces of the grooves 31a and 31b in terms of the angle relative to the principal surface 11a. The angle of the side surfaces of the second upper openings 71a and 71b relative to the principal surface 11a is 45 to 75 degrees.

The width w3b of the bottom surface of each of the second upper openings 71a and 71b is smaller than the width of the first electrode 41. Thus, the second electrode 42 and the third electrode 43 are also not formed on the side surfaces of the active waveguides 12a and 12b in the second embodiment.

A method for controlling the angle of the second upper openings 71a and 71b will be described. The second upper openings 71a and 71b are formed by dry-etching the second resin layer 54 and the second insulating layer 53. The dry etching is performed using a mixture gas of $CF_4$ and $O_2$. This dry etching is performed under etching conditions such as low ion density and low directivity of ions. Thus, the second upper openings 71a and 71b are formed so that the side surfaces of the second upper openings 71a and 71b are inclined. The angle of the side surfaces is, for example, 50 degrees.

According to the production method, even if the second resin layer 54 has a large thickness, the etch depth of the second upper openings 71a and 71b does not excessively increase. Therefore, no electrodes are formed on the side surfaces of the active waveguides.

The present invention is not limited to the above-described first embodiment and second embodiment. For example, the core layer 23 may have an MQW structure composed of AlGaInAs and AlInAs or may be a bulk layer composed of GaInAsP. The first insulating layer 51, the second insulating layer 53, and the third insulating layer 55 can be composed of silicon nitride ($Si_3N_4$), oxynitride (SiON), or the like. The first resin layer 52 and the second resin layer 54 can be composed of polyimide resin instead of BCB resin.

Although the principles of the present invention in preferred embodiments are described, any person skilled in the art understands that the present invention may be changed with regard to arrangement and details without departing from such principles. The present invention is not limited to the particular structures disclosed in the embodiments. Therefore, rights regarding all modifications and changes within the scope of the claims and spirit thereof are claimed.

What is claimed is:

1. A method for producing a semiconductor optical device, comprising the steps of:
   forming a first optical waveguide and a second optical waveguide on a principal surface of a substrate;
   forming a first resin layer on the principal surface of the substrate, on top surfaces of the first and the second optical waveguides, and on side surfaces of the first and second optical waveguides;
   forming an opening in the first resin layer on the first optical waveguide by etching the first resin layer to the first optical waveguide without etching the first resin layer on the second optical waveguide;
   forming a first electrode in a part of the opening, the first electrode being in contact with the top surface of the first optical waveguide through the opening;
   forming a second resin layer on the first electrode and on the first resin layer, the second resin layer filling the opening;
   forming a groove by etching the second resin layer on the first electrode without etching the second resin layer on the second optical waveguide until a top surface of the first electrode is exposed;
   forming a second electrode on the second resin layer, on a side surface of the groove, and on the top surface of the first electrode; and
   forming a third electrode on the second electrode, wherein
   in the step of forming the groove, the groove is formed to have a width smaller than a width of the first electrode at a bottom surface of the groove,
   the third electrode is configured to fill the groove,
   the second and third electrodes have a region in which the second and third electrodes pass over the second optical waveguide, and
   in said region, the first and second resin layers are disposed between the second electrode and the second optical waveguide, the second electrode being separated in a direction perpendicular to the principal surface of the substrate at a predetermined distance from the top surface of the second optical waveguide.

2. The method according to claim 1, wherein the second resin layer has a thickness larger than a height of the second optical waveguide in the region in which the second and third electrodes pass over the second optical waveguide.

3. The method according to claim 1, wherein, in the step of forming the first resin layer, the first resin layer has a surface higher than the top surface of the first optical waveguide,
   the surface of the first resin layer is separated at a predetermined distance from the top surface of the first optical waveguide, and
   the distance between the surface of the first resin layer and the top surface of the first optical waveguide is smaller than one half of the height of the first optical waveguide.

4. The method according to claim 1, wherein, in the step of forming the groove, the side surface of the groove is formed to extend in a direction substantially perpendicular to the principal surface of the substrate.

5. The method according to claim 1, further comprising the steps of:
   before the formation of the second resin layer, forming an insulating layer on the first resin layer and on the first electrode; and
   after the formation of the groove in the second resin layer, etching the insulating layer using the second resin layer as a mask until the top surface of the first electrode is exposed.

6. The method according to claim 1, wherein, in the step of forming the opening, the opening is formed to have a width larger than a width of the first optical waveguide at a bottom surface of the opening, and
   in the step of forming the first electrode, the first electrode is formed to have a width larger than the width of the first optical waveguide.

7. The method according to claim 1, wherein the second electrode is formed by a sputtering method, and the third electrode is formed by a plating method.

8. The method according to claim 1, wherein, in the step of forming the groove, the groove is formed to extend in a direction parallel to the first optical waveguide, and the side surface of the groove is formed to be entirely surrounded by the second resin layer.

* * * * *